UNITED STATES PATENT OFFICE.

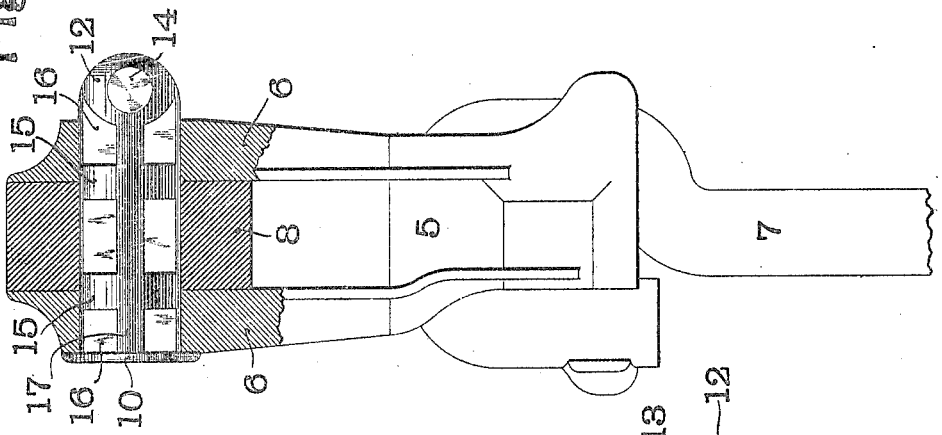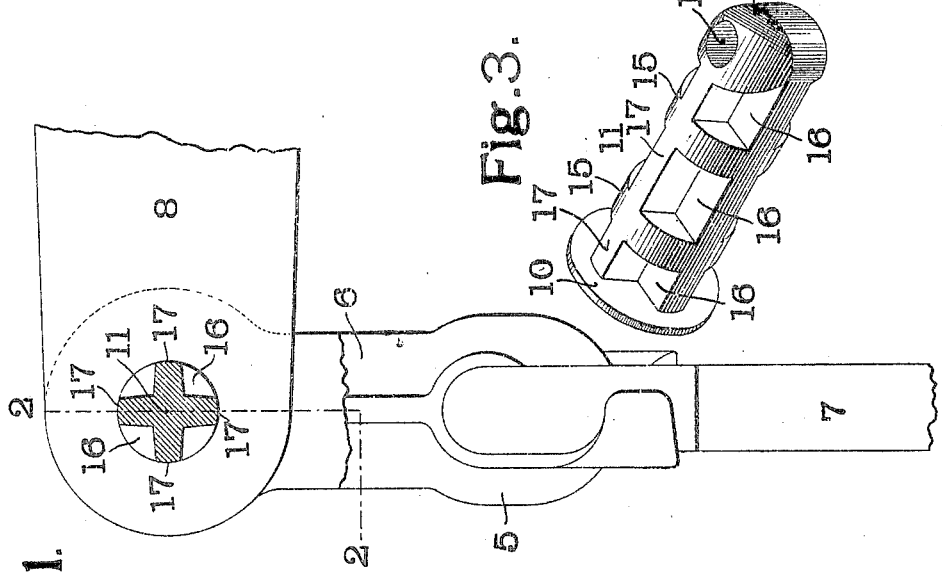

ARTHUR LIPSCHUTZ, OF ST. LOUIS, MISSOURI.

PIN FOR BRAKE-ROD JAWS OR THE LIKE.

No. 802,518.        Specification of Letters Patent.        Patented Oct. 24, 1905.

Application filed March 15, 1905. Serial No. 250,239.

*To all whom it may concern:*

Be it known that I, ARTHUR LIPSCHUTZ, a citizen of the United States, residing in the city of St. Louis, State of Missouri, have invented a certain new and useful Pin for Brake-Rod Jaws or the Like, of which the following is such a full, clear, and exact description as will enable any one skilled in the art to which it appertains to make and use the same, reference being had to the accompanying drawings, forming part of this specification.

My invention relates to a pin for use in pivoting a brake-rod jaw or similar device to another part—such, for instance, as a brake-beam.

The object of my invention is to provide a pin for the purpose above mentioned which can be cast and which will be of sufficient strength to resist the shearing strain between the jaw and the brake-lever and at the same time save as much metal as possible in the construction of the pin. I accomplish this object by providing the pin at a point or points within the opening through the brake-jaw and brake-lever with one or more bearings, which are of the full cross-section of the pin, and also providing the said pin at other points within the said openings in the jaw and lever with reduced portions, these reduced portions preferably being provided with ribs which are flush with the periphery of the bearing or bearings.

In the accompanying drawings, which illustrate a pin made in accordance with my invention, together with a brake-rod jaw and a portion of a brake-lever pivoted thereto by means of a pin, Figure 1 is a side elevation, one of the arms of the jaw being broken away and the pin being shown in section. Fig. 2 is a section on the line 2 2 of Fig. 1, and Fig. 3 is an isometric projection of the pin alone.

Like marks of reference refer to similar parts in all the views of the drawings.

5 represents the brake-rod jaw, which may be of any usual form. The brake-rod jaw 5 is provided with two arms 6 and has secured to it in any suitable manner the brake-rod 7. Between the two arms 6 is pivoted the brake-lever 8. The jaw and lever are connected by the pin, which consists of a head 10, a body 11, and a projecting end 12, in which is formed an opening 13 for the reception of a cotter-pin 14 for holding the pivot-pin in position. I provide the body 11 of the pin with two bearings 15, which are of the full cross-sectional area of the body of the pin. These bearings 15 are arranged at such points in the length of the pin that when the pin is in position, as shown in Fig. 2, these bearings will overlap the two joints between the arms of the brake-rod jaw and the brake-lever, thus presenting the full area of the pin to the shearing strain between the jaw and the lever. Intermediate these two bearings 15 and also at each end thereof I provide the body of the pin with recesses 16, so as to reduce the amount of metal contained in the pin. These recesses 16 are preferably so formed as to leave ribs 17, which are flush with the peripheries of the bearings 15. By thus providing the reduced portions of the body of the pin with ribs flush with the peripheries of the bearings I not only strengthen the pin as a whole, but also avoid any difficulty in placing the pin in position in the openings through the jaw and lever.

It will be evident that my improved form of pin presents the same amount of metal to the shearing action between the jaw and the lever as is presented by a solid pin, and consequently for all practical purposes my pin has the same strength as a solid pin, while, on the other hand, I effect a considerable saving of metal in the construction of the pin.

Having fully described my invention, what I claim as new, and desire to secure by Letters Patent of the United States, is—

1. A pin for brake-rod jaws or the like, having a body portion provided with a bearing, said body portion being also provided with a part of less cross-sectional area than said bearing, said part of less cross-sectional area being provided with ribs flush with the periphery of said bearing.

2. A pin for brake-rod jaws or the like having a head, an end portion provided with a cotter-pin hole, and a body portion intermediate of said head and end portion, said body portion having a bearing, and also having a part of less cross-sectional area than said bearing, said part of less cross-sectional area being provided with ribs flush with the periphery of said bearing.

3. A pin for brake-rod jaws or the like, having a body portion provided with a bearing, and a part at each end of said bearing of less cross-sectional area than said bearing.

4. A pin for brake-rod jaws or the like, having a body portion provided with a bearing, and a part at each end of said bearing of less cross-sectional area than said bearing, said parts of less cross-sectional area being provided with ribs flush with the periphery of said bearing.

5. A pin for brake-rod jaws or the like, having a body portion provided with a pair of bearings, and an intermediate part of less cross-sectional area than said bearings, said intermediate part having ribs flush with the peripheries of said bearings.

6. A pin for brake-rod jaws or the like, having a body portion provided with a pair of bearings, and an intermediate and two end portions of less cross-sectional area than said bearings.

7. A pin for brake-rod jaws or the like, having a body portion provided with a pair of bearings, and an intermediate and two end portions of less cross-sectional area than said bearings, said intermediate and end portions being provided with ribs flush with the peripheries of said bearings.

8. The combination with a pair of relatively movable parts, each provided with an opening, of a pin passing through said openings, said pin having a bearing within said openings, and a part also within said opening of less cross-sectional area than said bearing, said part of less cross-sectional area being provided with ribs flush with the periphery of said bearing.

In testimony whereof I have hereunto set my hand and affixed my seal in the presence of the two subscribing witnesses.

ARTHUR LIPSCHUTZ. [L. S.]

Witnesses:
   W. A. ALEXANDER,
   BENNETTE PIKE.